(12) United States Patent
Wang et al.

(10) Patent No.: US 10,778,993 B2
(45) Date of Patent: Sep. 15, 2020

(54) METHODS AND APPARATUS FOR DERIVING COMPOSITE TRACKS WITH TRACK GROUPING

(71) Applicant: MediaTek Inc., Hsin-Chu (TW)

(72) Inventors: Xin Wang, San Jose, CA (US); Lulin Chen, San Jose, CA (US); Shuai Zhao, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 85 days.

(21) Appl. No.: 16/014,856

(22) Filed: Jun. 21, 2018

(65) Prior Publication Data

US 2018/0376152 A1 Dec. 27, 2018

Related U.S. Application Data

(60) Provisional application No. 62/523,880, filed on Jun. 23, 2017.

(51) Int. Cl.
*H04N 13/00* (2018.01)
*H04N 19/169* (2014.01)
(Continued)

(52) U.S. Cl.
CPC ......... *H04N 19/1883* (2014.11); *H04N 19/31* (2014.11); *H04N 19/33* (2014.11); *H04N 19/503* (2014.11); *H04N 19/597* (2014.11); *H04N 19/88* (2014.11); *H04N 19/89* (2014.11); *H04N 21/234327* (2013.01); *H04N 21/4223* (2013.01); *H04N 21/816* (2013.01)

(58) Field of Classification Search
USPC .......... 348/42, 47, 48, 51, 61; 386/326, 335, 386/239
See application file for complete search history.

(56) References Cited

U.S. PATENT DOCUMENTS

| | | | |
|---|---|---|---|
| 2011/0069153 A1* | 3/2011 | Nakane | H04N 19/597 348/43 |
| 2017/0032553 A1* | 2/2017 | O'Donovan | G06N 7/005 |
| 2018/0376125 A1 | 12/2018 | Wang et al. | |

OTHER PUBLICATIONS

[No Author Listed], Compositing and Blending Level 1. W3C Candidate Recommendation. Jan. 13, 2015:1-33.
(Continued)

*Primary Examiner* — Daquan Zhao
(74) *Attorney, Agent, or Firm* — Wolf, Greenfield & Sacks, P.C.

(57) ABSTRACT

The techniques described herein relate to methods, apparatus, and computer readable media configured to derive a composite track. Three-dimensional video data includes a plurality of two-dimensional sub-picture tracks associated with a viewport. A composite track derivation for composing the plurality of two-dimensional sub-picture tracks for the viewport includes data indicative of the plurality of two-dimensional sub-picture tracks belonging to a same group, placement information to compose sample images from the plurality of two-dimensional tracks into a canvas associated with the viewport, and a composition layout operation to adjust the composition if the canvas comprises a composition layout created by two or more of the plurality of two-dimensional sub-picture tracks composed on the canvas. The composite track derivation can be encoded and/or used to decode the three-dimensional video data.

19 Claims, 12 Drawing Sheets

(51) Int. Cl.
*H04N 19/33* (2014.01)
*H04N 19/89* (2014.01)
*H04N 19/31* (2014.01)
*H04N 21/2343* (2011.01)
*H04N 21/4223* (2011.01)
*H04N 19/503* (2014.01)
*H04N 19/88* (2014.01)
*H04N 19/597* (2014.01)
*H04N 21/81* (2011.01)
*H04N 9/47* (2006.01)

(56) References Cited

OTHER PUBLICATIONS

[No Author Listed], Information technology—Coding of audio-visual objects, Part 12: ISO base media file format. International Standard, ISO/IEC 14496-12, Fifth Edition. Feb. 20, 2015:250 pages.

[No Author Listed], Information technology—MPEG systems technologies—Part 10: Carriage of timed metadata metrics of media in ISO base media file format / Amd 1 Carriage of spatial information. ISO/IEC 23001-10:2015/FDAM 1:2016(E), ISO/IEC JTC1/SC29/WG11 N16191. Jun. 2, 2016:8 pages.

Chen et al., Carriage of alpha compositing metadata in MPEG file format. Organisation for Standardisation, Coding of Moving Pictures and Audio, ISO/IEC JTC1/SC29/WG11 MPEG2017/M40401. Apr. 2017:3 pages.

Chen et al., OMAF: Sub-Picture Track Composition Processing. Organisation for Standardisation, Coding of Moving Pictures and Audio, ISO/IEC JTC1/SC29/WG11 MPEG2017/M41002. Jul. 2017:4 pages.

Choi et al., Text of ISO/IEC DIS 23090-2 Omnidirectional Media Format. International Organisation for Standardisation, Coding of Moving Pictures and Audio, ISO/IEC JTC1/SC29/WG11 N16824. Apr. 2017:61 pages.

Wang et al., Deriving Composite Tracks in ISOBMFF using Track Grouping Mechanisms. Organisation for Standardisation, Coding of Moving Pictures and Audio, ISO/IEC JTC1/SC29/WG11 MPEG2016/M40384. Apr. 2017:12 pages.

Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.

U.S. Appl. No. 16/014,817, filed Jun. 21, 2018, Wang et al.

\* cited by examiner

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

FIG. 4A

```
aligned(8) class SubPictureCompositionBox extends TrackGroupTypeBox('spco')
{
    unsigned int(16)   composition_width;
    unsigned int(16)   composition_height;
    unsigned int(1)    matrix_flag;
    unsigned int(1)    blending_flag;
    unsigned int(6)    reserved = 0
    if (matrix_flag == 1){
        template int(32)[9]    matrix=
            { 0x00010000,0,0,0x00010000,0,0,0,0x40000000 }; //
unity matrix
        unsigned int(32) width;
        unsigned int(32) height;
        template int(16) layer = 0;
    }
    // other composition info can be added here
    if (blending_flag == 1){
        unsigned int(8) alpha_blending_mode;
        unsigned int(8) blending_mode_specific_params[] = 0;
    }
}
```

$$(p\ q\ 1) * \begin{vmatrix} a & b & u \\ c & d & v \\ x & y & w \end{vmatrix} = (m\ n\ z)$$

$m = ap + cq + x; \quad n = bp + dq + y; \quad z = up + vq + w;$ $p' = m/z; \quad q' = n/z$

FIG. 4C

| Value | Compositing mode | Description |
|---|---|---|
| | | 500 |
| 1 | Clear | No regions are enabled. |
| 2 | Source | Only the source will be present. |
| 3 | Destination | Only the destination will be present. |
| 4 | Source Over | Source is placed over the destination. |
| 5 | Destination Over | Destination is placed over the source. |
| 6 | Source In | Source that overlaps the destination, replaces the destination. |
| 7 | Destination In | Destination which overlaps the source, replaces the source. |
| 8 | Source Out | Source is placed, where it falls outside of the destination. |
| 9 | Destination Out | Destination is placed, where it falls outside of the source. |
| 10 | Source Atop | Source which overlaps the destination, replaces the destination. Destination is placed elsewhere. |
| 11 | Destination Atop | Destination which overlaps the source replaces the source. Source is placed elsewhere. |
| 12 | XOR | The non-overlapping regions of source and destination are combined. |
| 13~16 | Reserved | |
| 17 | Dissolve | Takes random pixels from both layers. With high opacity, most pixels are taken from the source layer. With low opacity most pixels are taken from the destination layer. |

FIG. 5A

| Value | Compositing mode | Description 500 |
|---|---|---|
| 18 | Plus | Display the sum of the source image and destination image. |
| 19 | Multiply | The source color is multiplied by the destination color and replaces the destination. |
| 20 | Screen | The values of the pixels in the two layers are inverted, multiplied, and then inverted again |
| 21 | Overlay | Overlay combines Multiply and Screen blend modes. |
| 22 | Darken | Selects the darker of the destination and source colors. |
| 23 | Lighten | Selects the lighter of the destination and source colors |
| 24 | Color_dodge | Brightens the destination color to reflect the source color |
| 25 | Color_burn | Darkens the destination color to reflect the source color |
| 26 | Hard_light | Multiplies or screens the colors, depending on the source color value. |
| 27 | Soft_light | Darkens or lightens the colors, depending on the source color value. |
| 28 | Difference | Subtracts the darker of the two constituent colors from the lighter color |
| 29 | Exclusion | Produces an effect similar to that of the Difference mode but lower in contrast. |
| 30 ~ 255 | Reserved | For new modes or non-separable blending modes. |

FIG. 5B

```
aligned(8) class SubPictureTrackGroupComposition
extends TransformProperty ('tgcp') {
    unsigned int(4) background_flag;
    unsigned int(1) blending_flag;
    unsigned int(11) reserved = 0;
    if ((background_flag & 1) == 1) // background
color       for (j=0; j<4; j++)
                unsigned int(16) canvas_fill_value;
    if ((background_flag &2) == 2) // background
image       unsigned int(16) image_item_ID;
    if (blending_flag == 1) {
        unsigned int(8) alpha_blending_mode;
        unsigned int(8)
blending_mode_specific_params[] = 0;
    }
}
```

FIG. 7

```
aligned(8) class
SubPictureTrackGroupMatrixComposition
extends TransformProperty ('tmcp') {
    unsigned int(4) background_flag;
    unsigned int(1) blending_flag;
    unsigned int(11) reserved = 0;
    if ((background_flag & 1) == 1) // background
color
        unsigned int(16) canvas_fill_value;
    if ((background_flag & 2) == 2) // background
image
        unsigned int(16) image_item_ID;
    if (blending_flag == 1) {
        unsigned int(8) alpha_blending_mode;
        unsigned int(8)
blending_mode_specific_params[] = 0;
    }
}
```

- 802 → aligned(8) class SubPictureTrackGroupMatrixComposition
- 804 → unsigned int(4) background_flag
- 810 → unsigned int(1) blending_flag
- 806 → canvas_fill_value
- 808 → image_item_ID
- 812 → alpha_blending_mode
- 814 → blending_mode_specific_params
- 800 (overall)

FIG. 8

METHODS AND APPARATUS FOR DERIVING COMPOSITE TRACKS WITH TRACK GROUPING

RELATED APPLICATIONS

This Application claims priority under 35 U.S.C. § 119(e) to U.S. Provisional Application Ser. No. 62/523,880 filed Jun. 23, 2017, which is herein incorporated by reference in its entirety.

This case was filed on the same day as co-pending application Ser. No. 16/014,817, entitled "METHODS AND APPARATUS FOR DERIVING COMPOSITE TRACKS," which is hereby incorporated by reference herein in its entirety.

TECHNICAL FIELD

The techniques described herein relate generally to video coding, and particularly to deriving composite tracks with track grouping.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for deriving composite tracks with track grouping.

Some embodiments relate to an encoding method for encoding a composite track derivation for a plurality of sub-picture tracks. The method includes encoding three-dimensional video data, comprising encoding a plurality of two-dimensional sub-picture tracks associated with a viewport. The method includes encoding a composite track derivation for composing the plurality of two-dimensional sub-picture tracks for the viewport, wherein the composite track derivation comprises data indicative of: the plurality of two-dimensional sub-picture tracks belonging to a same group; placement information for each of the plurality of two-dimensional sub-picture tracks, wherein the placement information can be used to compose sample images from the plurality of two-dimensional tracks into a canvas associated with the viewport; and a composition layout operation to adjust the composition if the canvas comprises a composition layout created by two or more of the plurality of two-dimensional sub-picture tracks composed on the canvas. The method includes providing the encoded three-dimensional video data and the composition layout operation.

In some examples, the composition layout comprises a gap between the two or more of the plurality of two-dimensional sub-picture tracks composed on the canvas, an overlap of the two or more of the plurality of two-dimensional sub-picture tracks composed on the canvas, or both.

In some examples, encoding the composite track derivation comprises encoding a width, a height, or both, of the canvas in a sub-picture composition track group box contained in each of the two-dimensional sub-picture tracks.

In some examples, encoding the composite track derivation comprises encoding a size, a location, or both, of sample images in the canvas in a sub-picture composition track group box contained in each of the two-dimensional sub-picture tracks.

In some examples, encoding the composite track derivation comprises: encoding a size, a location, or both, of sample images in the canvas in a track header box of a track containing the two-dimensional sub-picture tracks; and encoding the containing track in the sub-picture composition track group box contained in each of the two-dimensional sub-picture tracks. Encoding the composite track derivation can include encoding a matrix in the sub-picture composition track group box, wherein the matrix used to overlay each of the plurality of two-dimensional sub-picture tracks on the canvas.

Some embodiments relate to a decoding method for decoding video data to derive a composite track. The method includes receiving (a) a plurality of encoded two-dimensional sub-picture tracks associated with a viewport and (b) a composite track derivation for composing the plurality of two-dimensional sub-picture tracks for the viewport, wherein the composite track derivation comprises data indicative of: the plurality of two-dimensional sub-picture tracks belonging to a same group; placement information for each of the plurality of two-dimensional sub-picture tracks, wherein the placement information can be used to compose sample images from the plurality of two-dimensional tracks into a canvas associated with the viewport; and a composition layout operation to adjust the composition if the canvas comprises a composition layout created by two or more of the plurality of two-dimensional sub-picture tracks composed on the canvas carried in a derived track. The method includes determining the plurality of two-dimensional sub-picture tracks belonging to a same group. The method includes composing the plurality of two-dimensional tracks into the canvas according to the composite track derivation to derive a composite track, comprising: determining two or more of the composed two-dimensional sub-picture tracks comprise the composition layout; and adjusting the composition based on the composition layout operation to compensate for the composition layout.

In some examples, determining two or more of the composed two-dimensional sub-picture tracks comprise the composition layout comprises determining two or more of the composed two-dimensional sub-picture tracks comprise a gap between the two or more of the plurality of two-dimensional sub-picture tracks composed on the canvas, an overlap of the two or more of the plurality of two-dimensional sub-picture tracks composed on the canvas, or both.

In some examples, the method further comprises decoding the composite track derivation, comprising decoding a width, a height, or both, of the canvas in a sub-picture composition track group box contained in each of the two-dimensional sub-picture tracks.

In some examples, the method further comprises decoding the composite track derivation, comprising decoding a size, a location, or both, of sample images in the canvas in a sub-picture composition track group box contained in each of the two-dimensional sub-picture tracks.

In some examples, the method further includes decoding the composite track derivation, comprising: decoding a size, a location, or both, of sample images in the canvas in a track header box of a track containing the two-dimensional sub-picture tracks; and decoding the containing track in the sub-picture composition track group box contained in each of the two-dimensional sub-picture tracks. Decoding the composite track derivation can include decoding a matrix in the sub-picture composition track group box, wherein the matrix is used to overlay each of the plurality of two-dimensional sub-picture tracks on the canvas.

Some embodiments relate an apparatus configured to decode video data. The apparatus comprises a processor in communication with memory, the processor being configured to execute instructions stored in the memory that cause the processor to receive (a) a plurality of encoded two-dimensional sub-picture tracks associated with a viewport and (b) a composite track derivation for composing the plurality of two-dimensional sub-picture tracks for the viewport, wherein the composite track derivation comprises data indicative of: the plurality of two-dimensional sub-picture tracks belonging to a same group; placement information for each of the plurality of two-dimensional sub-picture tracks, wherein the placement information can be used to compose sample images from the plurality of two-dimensional tracks into a canvas associated with the viewport; and a composition layout operation to adjust the composition if the canvas comprises a composition layout created by two or more of the plurality of two-dimensional sub-picture tracks composed on the canvas carried in a derived track. The instructions cause the processor to determine the plurality of two-dimensional sub-picture tracks belonging to a same group. The instructions cause the processor to compose the plurality of two-dimensional tracks into the canvas according to the composite track derivation to derive a composite track, comprising determining two or more of the composed two-dimensional sub-picture tracks comprise the composition layout, and adjusting the composition based on the composition layout operation to compensate for the composition layout.

In some examples, determining two or more of the composed two-dimensional sub-picture tracks comprise the composition layout comprises determining two or more of the composed two-dimensional sub-picture tracks comprise a gap between the two or more of the plurality of two-dimensional sub-picture tracks composed on the canvas, an overlap of the two or more of the plurality of two-dimensional sub-picture tracks composed on the canvas, or both.

In some examples, the instructions are further configured to cause the processor to decode the composite track derivation, comprising decoding a width, a height, or both, of the canvas in a sub-picture composition track group box contained in each of the two-dimensional sub-picture tracks.

In some examples, the instructions are further configured to cause the processor to decode the composite track derivation, comprising decoding a size, a location, or both, of sample images in the canvas in a sub-picture composition track group box contained in each of the two-dimensional sub-picture tracks.

In some examples, the instructions are further configured to cause the processor to decode the composite track derivation, comprising decoding a size, a location, or both, of sample images in the canvas in a track header box of a track containing the two-dimensional sub-picture tracks, and decoding the containing track in the sub-picture composition track group box contained in each of the two-dimensional sub-picture tracks. Decoding the composite track derivation further comprises decoding a matrix in the sub-picture composition track group box, wherein the matrix is used to overlay each of the plurality of two-dimensional sub-picture tracks on the canvas.

Some embodiments relate to an apparatus for encoding video data. The apparatus comprising a processor in communication with memory, the processor being configured to execute instructions stored in the memory that cause the processor to encode three-dimensional video data, comprising encoding a plurality of two-dimensional sub-picture tracks associated with a viewport. The instructions cause the processor to encode a composite track derivation for composing the plurality of two-dimensional sub-picture tracks for the viewport, wherein the composite track derivation comprises data indicative of: the plurality of two-dimensional sub-picture tracks belonging to a same group; placement information for each of the plurality of two-dimensional sub-picture tracks, wherein the placement information can be used to compose sample images from the plurality of two-dimensional tracks into a canvas associated with the viewport; and a composition layout operation to adjust the composition if the canvas comprises a composition layout created by two or more of the plurality of two-dimensional sub-picture tracks composed on the canvas. The instructions cause the processor to provide the encoded three-dimensional video data and the composition layout operation.

In some examples, the composition layout comprises a gap between the two or more of the plurality of two-dimensional sub-picture tracks composed on the canvas, an overlap of the two or more of the plurality of two-dimensional sub-picture tracks composed on the canvas, or both.

In some examples, encoding the composite track derivation comprises encoding a width, a height, or both, of the canvas in a sub-picture composition track group box contained in each of the two-dimensional sub-picture tracks.

In some examples, encoding the composite track derivation comprises encoding a size, a location, or both, of sample images in the canvas in a sub-picture composition track group box contained in each of the two-dimensional sub-picture tracks.

In some examples, encoding the composite track derivation comprises encoding a size, a location, or both, of sample images in the canvas in a track header box of a track containing the two-dimensional sub-picture tracks, and encoding the containing track in the sub-picture composition track group box contained in each of the two-dimensional sub-picture tracks. Encoding the composite track derivation can include encoding a matrix in the sub-picture composition track group box, wherein the matrix is used to overlay each of the plurality of two-dimensional sub-picture tracks on the canvas.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 4A shows an exemplary sub-picture composition track grouping, according to some examples.

FIG. 4B shows an exemplary sub-picture composition track grouping using matrix values, according to some examples.

FIG. 4C shows an exemplary transformation matrix, according to some examples.

FIGS. 5A-5B show an exemplary table of blending modes, according to some examples.

FIG. 7 shows an example of a sub picture track grouping composition with background and alpha blending information, according to some embodiments.

FIG. 8 shows an example of a sub picture track group matrix composition with background and alpha blending information, according to some embodiments.

DETAILED DESCRIPTION OF INVENTION

Various techniques can be used to derive composite tracks, including deriving composite tracks of file formats, such as ISOBMFF.

The inventors have found that existing file format techniques (e.g., such as sub-picture track grouping and timed metadata track techniques) do not provide for associating global information (e.g., specified in timed metadata tracks) about the entire 3D content carried collectively by a group of sub-picture tracks. For example, track grouping mechanisms can be used to associate sub-pictures with a group, but track grouping mechanisms do not provide for identifying whether each sub-picture track contributes to a particular region (e.g., the special region of interest, as discussed above), when the region information is specified in a timed metadata track. Thus, using existing grouping and timed metadata track techniques, it can be difficult to specify and/or determine which sub-picture track(s) will make a contribution to a particular viewport without going through all of the sub-picture tracks in the group.

The inventors have developed technological improvements to composite track derivation by using grouping mechanisms, which can be used to specify global metadata (such as a region of interest) for content carried collectively by a group of sub-picture tracks, each of which has its grouping metadata for the group. The grouping metadata can specify the sub-picture tracks associated with the group. The grouping metadata can also specify placement information (e.g., width, height, composition matrix) for each of the plurality of two-dimensional sub-picture tracks (e.g., based on sub-picture composition track group boxes and/or the track header indicated by the sub-picture composition track group boxes) that can be used to compose sample images from the plurality of two-dimensional tracks. The grouping metadata can further specify a composition layout operation (e.g., a background and/or blending information), such as an operation to adjust the composition if the canvas comprises a composition layout (e.g., which may or may not include a gap and/or overlay).

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
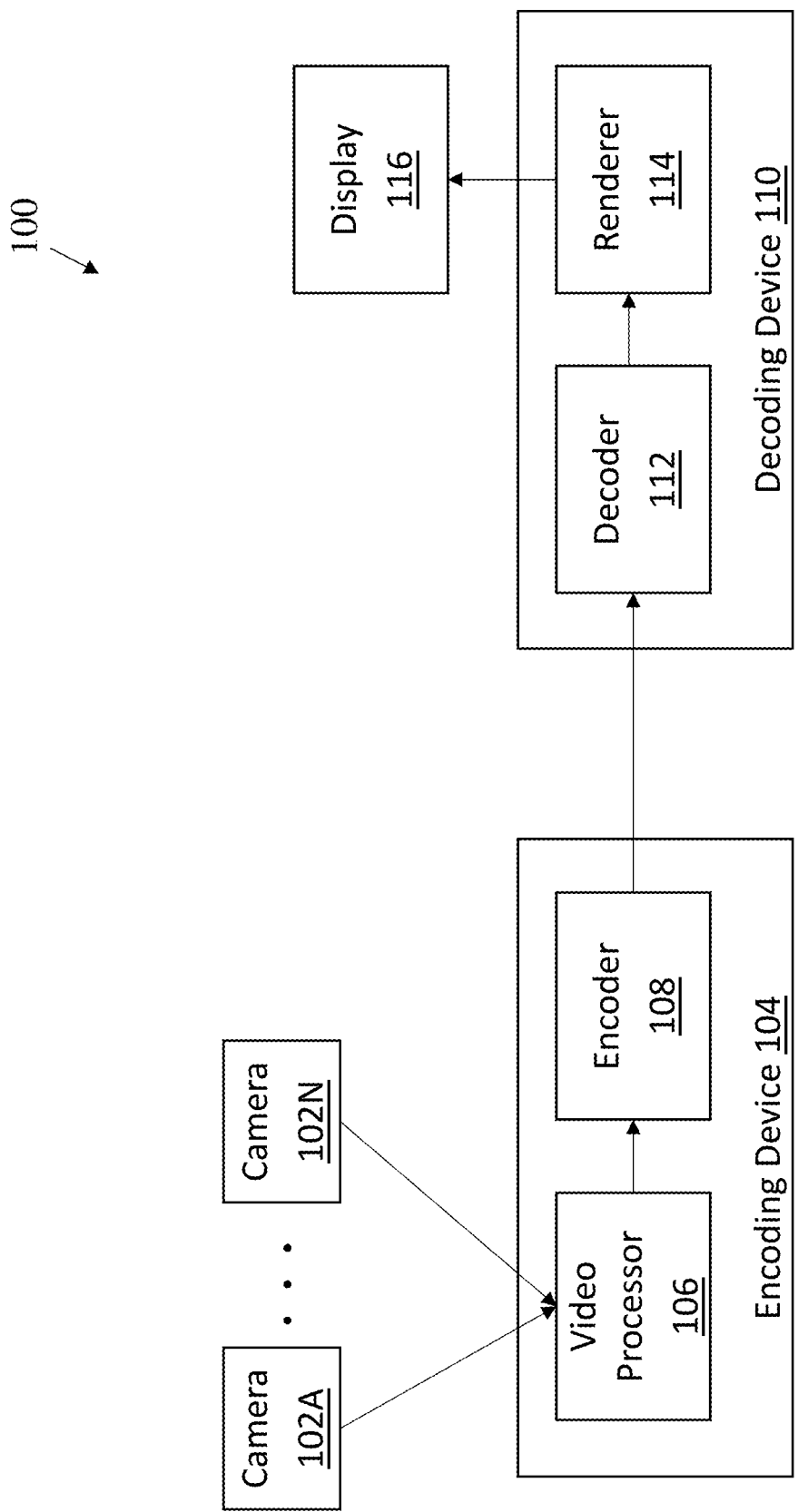
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a sphere. The display 116 displays the rendered content from the renderer 114.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared separately. In such implementations, a region of interest typically has a separate video track that carries the ROI content. Thus, the encoded video can be used to specify the ROI, and how the ROI video is associated with the underlying video.

ROI or viewport tracks, such as separately encoded ROI tracks, can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191), which is hereby incorporated by reference herein in its entirety, describes an ISO Base Media File Format (ISOBMFF) file format that uses a timed metadata track to signal that a main 2D video track has a 2D ROI track.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be provided, such that only those related to viewing screen (e.g., viewport) can be transmitted and delivered to the end user (for example, through wired or wireless connection or through any computer readable storage medium).

Figure 2:
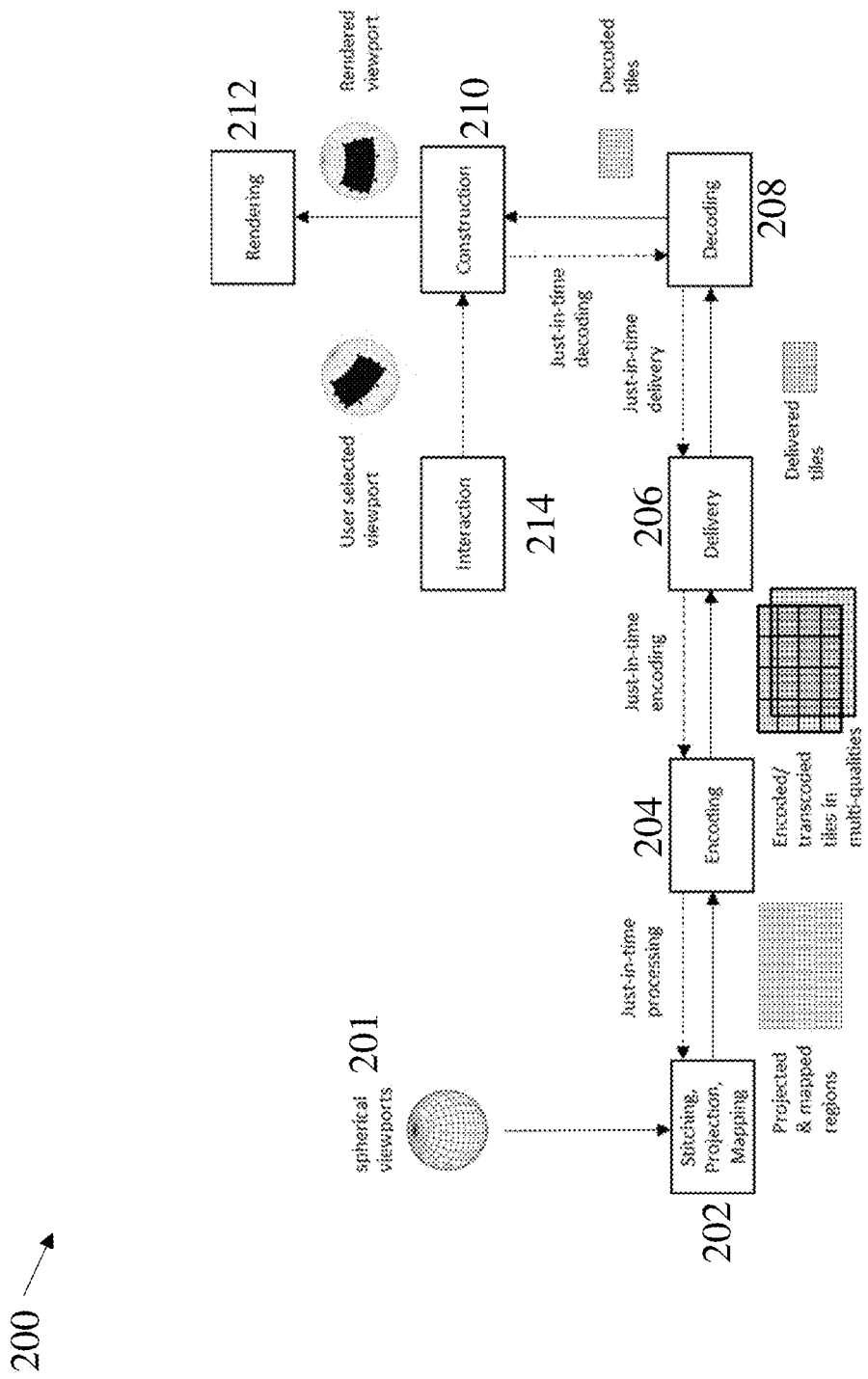
FIG. 2 a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the VR content presented using 3D spherical or any other 3D model is first processed (stitched, projected and mapped) onto a 2D plane (by block 202) and then encapsulated in a number of tile-based (or sub-picture-based) and segmented files (at block 204) for playback and delivery. In such a tile-based and segmented file, a spatial tile in the 2D plane (e.g., which represents a spatial portion, usually in a rectangular shape of the 2D plane content) is typically encapsulated as a collection of its variants (e.g., such as in different qualities and bitrates, or in different codecs and protection schemes (e.g., different encryption algorithms and modes)). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. The viewport can change and is therefore not static. For example, as a user moves their head, then the system needs to fetch neighboring tiles (or sub-pictures) to cover the content of what the user wants to view next. However, after performing viewport dependent processing, e.g., including chopping pictures and/or encode different qualities, techniques do not allow for specifying or associating metadata to the entire picture, or to the entire 3D spherical content.

ISOBMFF includes some grouping mechanisms for tracks (e.g., which can be used to group tiles). For example, boxes such as the Track Group Box 'trgr' and the Track Selection Box 'tsel', can be used to label tracks and to signal them as a group of tracks and an alternate group of tracks, respectively. By using such boxes, individual tracks with a same group identifier and group type belong to a same group. However, such track grouping mechanisms, through labeling individual tracks, can present a number of issues when used in the context of the generic viewport dependent content flow process. These issues can result from, for example, the fact that there is no a single "tile" track that represents content of the variant tracks of a tile, the fact that there is no single track that represents content of the entire spherical VR content which is a composition of all individual "tile" tracks, and/or the like. The issues can include, for example, an inefficiency in determining how many tracks belong to a particular group, without scanning through all the tracks in the file or all the relevant files.

In some embodiments, the viewport or ROI can be signaled using a composite track. Using a composite track provides a single track that can be used to represent the content of the variant tracks of a tile. As a further example, using composite tracks can help build a track hierarchy to indicate how tracks are related in terms of composite relationship, e.g., when the composite tracks are derived from variant tracks and (composite) tile tracks.

A derived track can be identified by the track containing sample entry of the type 'dtrk.' A derived sample can contain an ordered list of the operations to be performed sequentially on an ordered list of corresponding images or samples from an ordered list of input tracks. Each of the operations can be specified or indicated by the TransformProperty. For example, a list of TransformProperty operations can include identity ('idtt'); clean aperture ('clap'); rotation ('srot'); dissolve ('dslv'); crop ('2dcc'); and/or the like.

In order to support VR viewport dependent content flow processes, additional TransformProperty items can be used to derive composite tracks from existing tracks. Various types of composite tracks can be generated, such as a composite of all video tracks ('cmpa'), a composite of only one track ('cmp1,' which can allow switching at the sample and sample group levels), a composite of any track ('cmpn,' which can allow switching at the sample and sample group levels), a selection of only one track ('sel1,' which can be a track level selection, and may not include switching at the sample level), a selection of any track ('seln,' which can be a track level selection, and may not include switching at the sample level), a scaling ('scal'), a resize ('resz'), and/or the like.

For example, the 'cmpa' transform property can specify a reference width and height of a derived sample, and can place (e.g., composes) each input image onto the derived sample at its corresponding specified x,y location and specified size. The 'cmp1' transform property can specify a reference width and height of a derived sample, and can place one, anyone and only one of the input images onto the derived sample at its corresponding location and corresponding size. The 'cmpn' transform property can specify a reference width and height of a derived sample, and can place one or more of the input images onto the derived sample at their corresponding location and with their corresponding size. The 'sel1' transform property can specify a reference width and height of a derived sample, and can place one or more of the input images onto the derived sample at their corresponding location and corresponding size. The 'sel1' transform property can be like selecting one track from a list of input tracks. The 'seln' transform property can specify a reference width and height of a derived sample, and can place one or more input images from a same subset of input tracks selected throughout the entire transformation onto the derived sample at their corresponding location and with their corresponding size. The 'seln' transform property can be like selecting n (n>0) tracks from a list of input tracks.

Essentially, the 'cmpa,"cmp1,"cmpn,"sel1,' and 'seln' operations specify a number of '2dcc' like fields that provide 2D spatial information for composing input 2D image samples onto a derived 2D image sample, according to their respective definition and semantics. According to some embodiments, with these additional TransformProperty items, a "tile" track can be specified as a derived, composite track of its "variant" tracks using 'cmp1' or 'sel1." A track of the entire VR spherical content, when projected onto a 2D plane, can be specified as a derived, composite track of its "tile" tracks using 'cmpa.' A viewport or ROI track can be specified as a derived, composite track of its "tile" tracks using 'cmpn' or 'seln.' The techniques described in m33971, entitled "Deriving Composite Tracks in ISOBMFF," dated January, 2017, which is hereby incorporated by reference herein in its entirety, provide techniques for mapping the 2D composite track back to spherical 3D content.

The composite track derivation mechanisms mentioned above use the information or metadata of placement of each of the plurality of the sub-picture tracks on the projected or composed picture either in the transformProperty operations, in the sub-picture track headers, or both. The new composite track derivation mechanisms discussed herein can use the placement information or metadata provided in the grouping metadata of sub-picture composition tracks when they are grouped together using the track grouping mechanisms (e.g., the sub-picture composition track group boxes and/or the track headers indicated by the sub-picture composition track group boxes).

Figure 3:
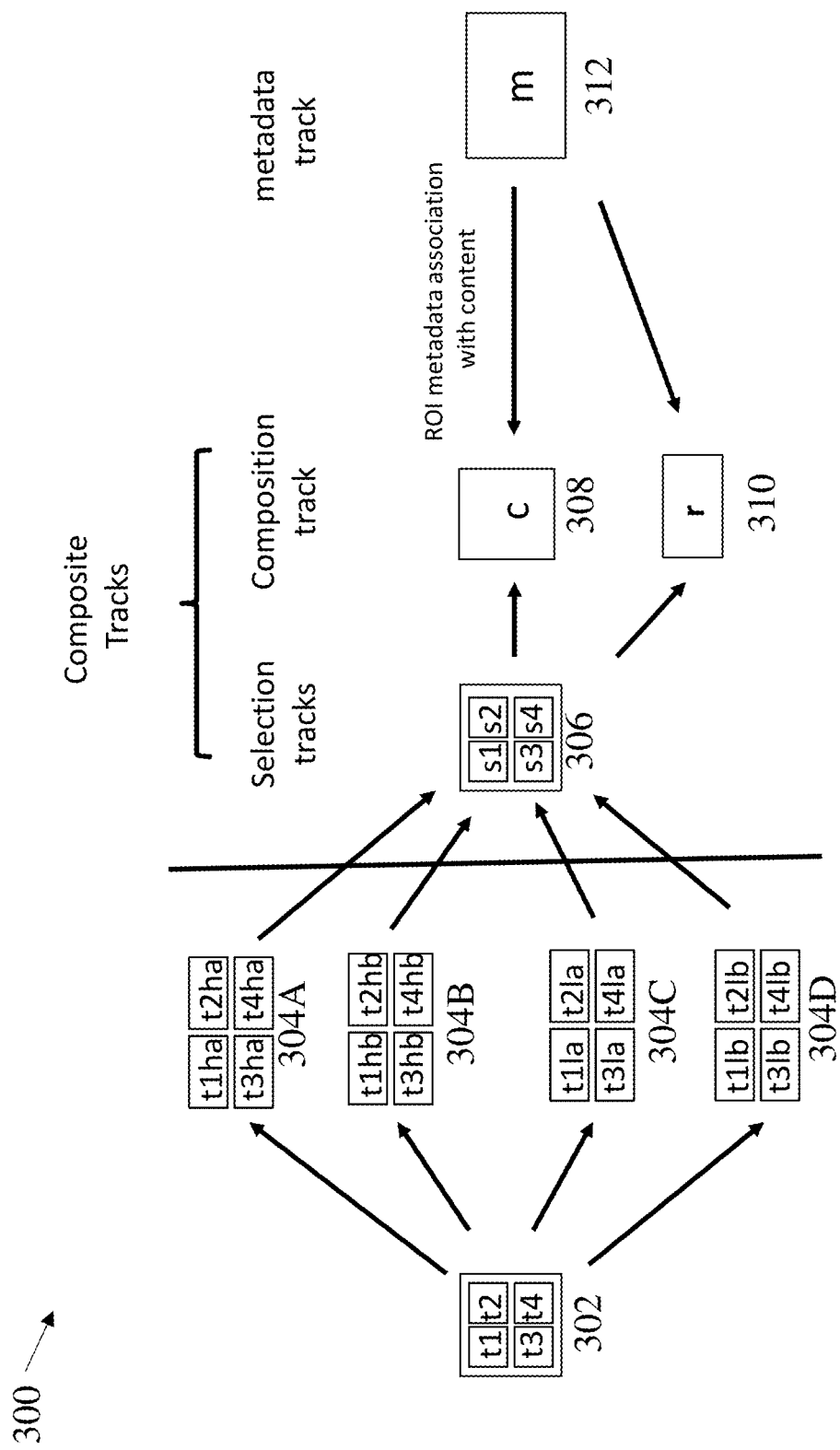
FIG. 3 shows an exemplary diagram of using a composite track to signal a viewport/ROI, according to some embodiments.

FIG. 3 shows an exemplary diagram 300 of using a composite track to signal a viewport/ROI, according to some embodiments. Four 2D sub-picture (or tile) tracks t1-t4 (302) are encoded for two different qualities (e.g., 'h' for HD and 's' for SD) and two different encryption modes (e.g., the Common Encryption Scheme (CENC) with encryption modes 'a' for Counter (CTR) and 'b' for Cipher Block Chaining (CBC)). The encoding and encryption generates four different groups of four tracks 304A-D (referred to as encoded tracks 304, generally), for a total of sixteen tracks. Encoded tiles 304A correspond to a high quality ('h') encoded using a first encryption mode ('a') (thus, 'ha'). Encoded tiles 304B correspond to a high quality ('h') encoded using a second encryption mode ('b') (thus, 'hb'). Encoded tiles 304C correspond to low quality ('l') encoded using a first encryption mode ('a') (thus, 'la'). Encoded tiles 304D correspond to a low quality ('l') encoded using a second encryption mode ('b') (thus, 'lb').

The composite track is generated based on the encoded tracks 304. Tiles are selected from the encoded tracks 304. The tiles can be selected based on one or more transform properties (e.g., in a list of TransformProperties, as discussed above). For example, four tiles s1-s4 are selected, according to the operations shown below for this example:
s1=sel1{cmp1{t1ha, t1la}, cmp1{t1hb, t1lb}}
s2=sel1{cmp1{t2ha, t2la}, cmp1{t2hb, t2lb}}
s3=sel1{cmp1{t3ha, t3la}, cmp1 {t3hb, t3lb}}
s4=sel1{cmp1{t4ha, t4la}, cmp1 {t4hb, t4lb}}

Referring to the exemplary operations above, composition (cmp1) and selection (sel1) are used because the composite track is coming from a number of different tracks encoded using different qualities and encryption modes. Quality variants are composed first using 'cmp1' and then encryption variants are composed using 'sel1.' For example, assume an m×n grid of sub-picture tracks, where each sub-picture has q different qualities and is encrypted in 2 modes, then there are m×n×q×2 tracks. But when adaptively streaming the content, only the quality for underlying connection bandwidth is dynamically selected, whereas the encryption mode is statically selected. Therefore, 'cmp1' is used to select the appropriate quality tile at the sample or sample group level, and 'sel1' is used to select the appropriate encrypted tile at the track level, as discussed above.

A composition is performed on the selected tracks 306 to composite the sub-pictures into 2D content tracks. The composition process generates a composition track C 308 and composition track r 310. The composition track C 308 can include data from all of the selected tracks 306, whereas the composition track r 310 can include data from a subset of the selected tracks 306. The composition track C 308 can be generated using, for example, cmpa{s1, s2, s3, s4}, which composites all the tiles. In some embodiments, if an ROI or viewport involves or is covered by any of the tiles t1, t2, t3 and t4, an ROI or viewport track can be determined using 'cmpn' (e.g., and/or possibly other transform properties if crop, resize or rotation are involved). For example, the ROI or viewport composition track r 310 can be determined using cmpn{s1, s2, s3, s4}. In some embodiments, if an ROI or viewport involves or is covered by only tiles t1 and t2, an ROI or viewport track can be determined using 'cmpa' (e.g., and/or possibly other transform properties if crop, resize or rotation are involved). For example, the composition track r 310 can be generated as cmpa{ s1, s2}. The encoder generates a metadata track m 312, such as a timed metadata track.

As shown in FIG. 2, the viewport notion is what the end-user views, which can be specified based on the angle and/or the size of the viewing region on the 3D sphere. As noted, the viewport is not static. For example, as a user moves their head, then the viewport changes so the system needs to fetch other tiles (or sub-pictures), such as neighboring tiles, to cover the content of what the user wants to view next. However, after performing viewport dependent processing, e.g., including chopping pictures and/or encode different qualities, techniques do not allow for specifying or associating metadata to the entire picture, or to the entire 3D spherical content. For example, existing techniques do not provide for specifying composition layout operations for a composition layout, such as gaps and overlap.

File formats, such as MPEG file formats, can include track grouping mechanisms. Track grouping mechanisms can be used to label individual tracks to form track groups. For example, the track group box field "trgr" discussed above can contain tracks that belong to a generic group. As another example, the track selection box "tsel" also discussed above can contain tracks that belong to a selective group.

File formats can also include techniques to construct and/or derive tracks. For example, derivation techniques can be used to combine tiles/sub-pictures into larger pictures, e.g., to indicate that the larger picture has certain regions. Some techniques can operate in the temporal domain, e.g., to aggregate or extract temporal segments from other tracks. Image processing operations can also be used to construct and/or derive tracks, and can include, for example, identity, crop, rotation, and/or dissolve operations. Track constructions and/or derivations can be used to take one copy from one track and then concatenate that to another feature from another track to form programs. For example, they can be used to play a commercial and then switch to another commercial, and so on. As another example, they can be used to insert a commercial into a program (e.g., as a derivation with a construction track from two different tracks—one from the commercial track and one from the TV track).

File formats can include transformations, such as a transformation matrix (e.g., which can be in the track header). Each track header can have a transformation matrix to specify how the pixels of the track itself are transformed into a larger picture, e.g., when being placed into a different/larger picture. The transformation matrix can be used for simple operations (e.g. pixel doubling, 90° rotation) and/or complex operations (e.g., shearing, arbitrary rotation).

File formats can also include blending metadata, such as alpha blending metadata, which can be used to perform alpha blending of two entities. The alpha blending metadata can be used for gaps or overlapping portions when putting tracks together. So blending metadata can be used to anticipate overlay and/or gaps, and can be used to specify how the overlay should be done, how a gap should be filled (e.g., the gap can be filled with the background, video, etc.), and/or the like.

In some embodiments, the alpha blending parameters can include compositing information, mode information, and/or specific parameters. For example, for ISOBMFF, a number of fields can be specified for the alpha blending metadata. The compositing_top_left_x and compositing_top_left_y fields can specify the top-left corner of the compositing space relative to the reference coordinate origin which may be specified by an application, or by a container format containing the base track and tile tracks of media data. The compositing_width and compositing_height fields can specify the width and height of the output image after composition. A field alpha_blending_mode can specify the alpha blending mode. A table with the various modes and the associated algorithms with default parameters may be specified in a separate document, e.g. ISO/IEC 23001-8 and/or a W3C recommendation. An exemplary table 500 of values for alpha_blending_mode are shown in FIGS. 5A-5B. The parameter value of 'layer' in TrackHeaderBox of each track, which specifies the front-to-back ordering of visual tracks, may be set and used as a relative front and back layer indicator for compositing two tracks. In the table 500, terms 'Source' and term 'Destination' are used interchangeably for the front/top layer and the back/bottom layer or the backdrop, respectively. A field blending_mode_specific_params can specify optional parameters with a given blending mode (e.g., other than using the default values specified in, e.g. ISO/IEC 23001-8, it may include alpha channel data).

Mechanisms can be used to indicate spatial information of visual items, which can be used, for example, for deriving composition tracks. For example, derivation of composition tracks is disclosed in m40384, entitled "Deriving Composite Tracks in ISOBMFF using track grouping mechanisms," dated April, 2017, Hobart, AU and m39971, entitled "Deriving Composite Tracks in ISOBMFF," dated January 2017, Geneva, CH, the contents of which are hereby incorporated by reference in their entirety. File formats, such as MPEG file formats (e.g., the MPEG ISOBMFF file format), can include techniques for composition track derivation that use track grouping. Referring to MPEG, for example, the composition information can be provided in the Composite of All 'cmpa' transform property. Generally, 'cmpa' can be used to specify the offset information for each track, where attributes are specified in the Transform Property. When present, 'cmpa' can specify that the number of input tracks (e.g., specified by num_inputs) is greater or equal to 1. As another example, 'cmpa' can specify that the input entities for the corresponding image operation are visual tracks. The input tracks can be restricted such that they all belong to the same track group (e.g., the input tracks all contain a Track Group Box 'trgr' with a same track group id value), and not any two of the tracks belong to a same alternate track group (e.g., they contain no Track Header Box 'tkhd' with a same non-zero alternate_group value that indicates they belong to a same alternate group for the purpose of selecting only one from the alternate group).

In MPEG, the fields of the sample 'cmpa' transform property can have the same semantics as the timed metadata sample entry and sample as specified in ISO/IEC 23001-10 (e.g., as described in n15177, entitled "Text of ISO/IEC 14496-12 5th edition, ISO Base Media File Format," filed February 2015, Geneva, CH, which is hereby incorporated by reference herein in its entirety). This can be done, for example, to consider each input image as an ROI of the derived image. The fields can include reference width and reference height, which can give respectively the width and height of the reference rectangular space in which all coordinates (e.g., top_left_x, top_left_y, width and height) are computed. The reference_width and reference_height fields can specify the size of the derived image, which is the composite of all input images of their corresponding input visual tracks.

The fields can also include top_left_x and top_left_y, which specify the horizontal and vertical coordinate, respectively, of the top-left corner of the rectangle region that the input media image of the corresponding track is to be placed. The fields can also include width and height, which can specify the width and height, respectively, of the rectangular region that the input media image of the corresponding track is to be placed.

Thus the 'cmpa' transform property can specify the reference width and height of a derived sample (e.g., reference_width and reference_height), and can place (or compose) each input image onto the derived sample at its corresponding location specified by top_left_x and top_left_y and with the corresponding size width and height.

Because the 'cmpa' fields can have the same semantics of these fields as in '2dcc' specified in ISO/IEC 23001-10, another way to specify the 'cmpa' transform property is to have an additional list of input tracks, the size of which is equal to num inputs, to indicate that each additional input track is a '2dcc' timed metadata track (e.g., a 2D Cartesian coordinates track) and that it carries the spatial information of the corresponding input track as an ROI of the derived track. The transform property can use these metadata tracks to compose the input visual tracks into the derived track.

Another example of techniques for specifying spatial information that can be used to derive composition tracks is the sub-picture composition track grouping (e.g., the 'spco' grouping). Generally, the 'spco' is a track group type that contains sub-picture composition information, such as x and y offsets, track width and height, and/or output (or composition) width and height. Each sub-picture track carries the 'spco' grouping box to indicate its group and related information, and also contains the sub-picture information. In MPEG ISOBMFF, a TrackGroupTypeBox with track group type equal to 'spco' indicates that the track belongs to a composition of tracks that can be spatially arranged to obtain pictures that are suitable for presentation. The visual tracks that are mapped to this grouping (e.g., which have the same value of track_group_id within TrackGroupTypeBox with track_group_type equal to 'spco') collectively represent the visual content that can be presented. A picture that is suitable for presentation can be composed by spatially arranging the time-parallel samples of the tracks of the same sub-picture composition track group as indicated by the syntax elements of the track group.

The 'spco' track grouping can include various fields. An exemplary 'spco' track grouping 400 is shown in FIG. 4A, according to some examples. The field track_x 402 specifies, in luma sample units, the horizontal position of the top-left corner of the samples of this track on the composed picture. The value of track_x 402 can range from 0 to composition_width 410-1, inclusive. The field track_y 404 specifies, in luma sample units, the vertical position of the top-left corner of the samples of this track on the composed picture. The value of track_y 404 can range from 0 to composition height 412-1, inclusive. The field track_width 406 specifies, in luma sample units, the width of the samples of this track on the composed picture. The value of track_width 406 can range from 1 to composition width 410-track_x 402, inclusive. The field track_height 408 specifies, in luma sample units, the height of the samples of this track on the composed picture. The value of track_height 408 can range from 1 to composition height 412-track_y 404, inclusive. The field composition width 410 specifies, in luma sample units, the width of the composed picture. The value of composition width 410 is greater than or equal to track_x 402+track_width 406. The field composition height 412 specifies, in luma sample units, the height of the composed picture. The field composition height 412 is greater than or equal to track_y 404+track_height 408.

The sub-picture composition track grouping can also be specified using matrix values. Generally, the matrix values can be specified in a number of different ways. For example, the matrix values can be specified by forming a group carried by the sub-picture as its own metadata. As another example, the matrix values can be specified by forming a sub-picture composition track group, and the information about the composition can be carried by the group box and/or by the track header.

For example, in MPEG ISOBMFF, the sub-picture composition track grouping box is described in n16824, entitled "Text of ISO/IEC DIS 23090-2, Omnidirectional Media Format," dated April 2017, Hobart, AU, which is hereby incorporated by reference herein in its entirety. The sub-picture composition box is modified to use matrix values in track header boxes (e.g., as described in m41002, entitled "OMAF: Sub-Picture Track Composition Processing," dated July 2017, Torino, IT, which is hereby incorporated by reference herein in its entirety) and to allow overlay blending (e.g., as proposed in m40401, entitled "Carriage of alpha compositing metadata in MPEG file format," dated April 2017, Hobart, AU, which is hereby incorporated by reference herein in its entirety). FIG. 4B shows 'spco' 450 using matrix values, according to some examples. The fields include a composition_width 452 and composition_height 454, as discussed above in conjunction with the composition_width 410 and composition height 412. The fields can also include a matrix 456, as shown in this example. The matrix 456 can be generalized as shown by the example matrix 470 shown in FIG. 4C. For example, the point (p, q) can transformed into (p', q') using the matrix 470. The values in the matrix 470 are stored in the order { a,b,u, c,d,v, x,y,w}. The matrix 470 is multiplied by (p, q, 1) to calculate (m, n, z), where m=ap+cq+x; n=bp+dq+y; and z=up+vq+w. Then (m, n, z) can be used to calculate (p', q') by calculating p'=m/z; q'=n/z. Referring further to the matrix 456, and (u,v,w) are restricted to (0,0,1), hex values (0,0, 0x40000000).

The fields can also include width 458 and height 460, which specify, in luma sample units, the width and the height, respectively, of the samples of this track on the composed picture. The layer field 462 specifies the front-to-back ordering of the video track. The field composition_width 452 is specified to be greater than or equal to x+width 458, and composition_height 454 is greater than or equal to y+height 460. The matrix 456, width 458, height 460, and layer 462 can have the same semantics as described in m39971 when the track is used for presentation. If these fields are present, then they override, respectively, the matrix, width, height, and layer fields in the TrackHeaderBox. Otherwise, if not present, matrix, width, height, and layer in the TrackHeaderBox are used, in which the value of flags is 0x000002 (for presentation) for width, height.

The fields also include alpha blending mode 464, which specifies the alpha blending mode. The values for the blending mode can include, for example, the values shown in exemplary table 500 in FIGS. 5A-5B. Such a table and the associated algorithms with default parameters may be specified in a separate MPEG document, e.g. ISO/IEC 23001-8 and/or a W3C recommendation (such as "Composing and Blending 1.0", W3C Candidate Recommendation, January 2015). The parameter value of 'layer' in TrackHeaderBox of each tracks which specifies the front-to-back ordering of visual tracks may be set and used as a relative front and back layer indicator for compositing two tracks.

The fields may also include a blending_mode_specific_params field 466 to specify optional parameters with a given blending mode, other than using those of default values specified in, e.g. ISO/IEC 23001-8. For example, the parameters may include alpha channel data.

The inventors have determined that existing composite track derivation techniques do not provide for associating global information for content carried collectively by a group of sub-picture tracks. For example, existing techniques may not allow metadata to be associated with the full picture, such as metadata to identify a particular region of interest within a full picture. For example, it may be desirable to identify a portion of the 3D content for the user to view (e.g., if at some angle or viewpoint there is something you would like to call out to a remote user, it is desirable to highlight that part of the 3D content). However, since viewport dependent processing techniques may break the full 3D picture, it may not be possible to identify a portion of the content to point out to the user. Therefore, existing techniques do not provide for specifying any global information for content carried collectively by a group of sub-picture tracks.

For example, track grouping mechanisms can be used to associate sub-pictures with a group, but track grouping mechanisms do not provide for identifying whether each sub-picture track contributes to a particular region (e.g., the special region of interest, as discussed above). As an example, all of the sub-picture tracks can form a group of the larger 3D picture, but in the abstract there is no entity to hold that group—there is no way to associate metadata to the group of sub-picture tracks. For example, to associate metadata with the sub-picture tracks, all sub-picture tracks would need to carry the same metadata, which is complicated and difficult to maintain, and still breaks any relationship between the metadata and track. As another example, it is difficult to construct or design a particular viewport that only takes content from a number of sub-picture tracks to form the viewport. Thus, using existing grouping techniques, it is difficult to specify and/or determine which sub-picture track(s) will make a contribution to a particular viewport without going through all of the sub-picture tracks in the group. As a further example, grouping techniques do not include any order or organization—each sub-picture track simply has a label that the track is part of the group. Therefore, for example, if 3D content includes a number of groups, it is necessary to look at each sub-picture track to determine which group the sub-picture track belongs to.

The inventors have developed technological improvements to existing file formats for deriving composite tracks. The techniques can be used to specify global metadata to groups of sub-picture tracks. The techniques can allow sub-picture track groups to be specified in a manner that allows metadata to be associated with the content of the track group rather than needing to be individually specified for each sub-picture track. The metadata can specify how track derivation is performed. In some examples, the techniques can be used, for example, to specify criteria for overlay cases, including determining the background to use for fill and/or merge.

The inventors have developed technical improvements for composition track derivation. As discussed herein, the inventors have developed techniques for composition track derivation that use labeling mechanisms of sub-picture composition track grouping with track spatial information. The inventors have also developed techniques for composition track derivation that use the sub-picture composition track grouping with matrices. For example, as discussed above, the matrix information can include the matrix values in the header information of tracks in the ISOBMFF, which can provide transformation information, spatial composition information, and/or alpha composition metadata.

In some embodiments, the techniques can replace the track composition spatial information (e.g., explicitly specified in the TransformProperty, according to m40384 and m39971, discussed above) with the information specified in the track grouping boxes (e.g., as specified in n16824 and m41002, discussed above). With these and previously disclosed embodiments, an entire 2D frame track can be specified as a derived composition track of its tile or sub-picture tracks (e.g., 308, 310 in FIG. 2). Additionally, or alternatively, any ROI track can be specified as a derived composite track of its related covering tile or sub-picture tracks.

Figure 6:
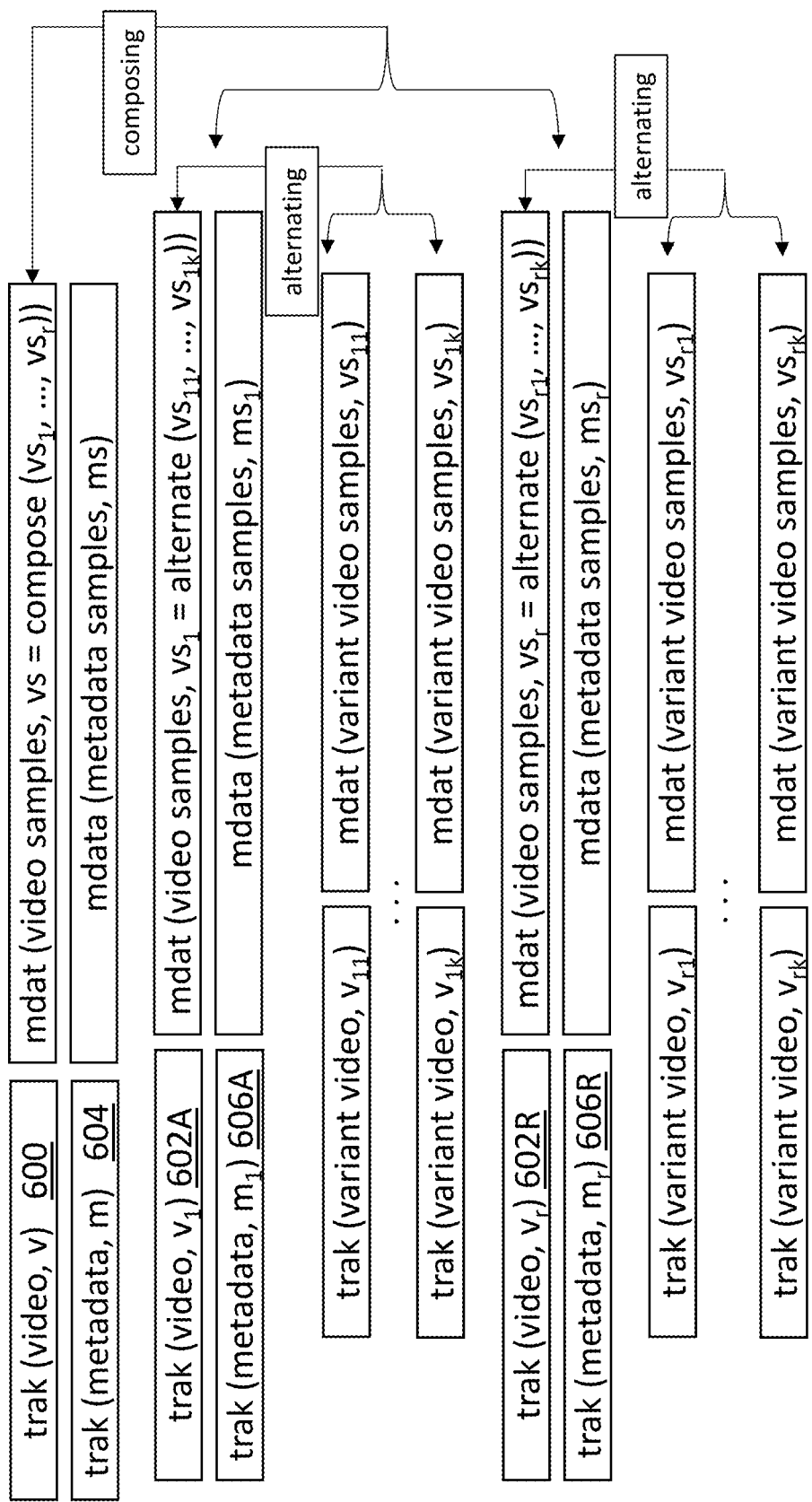
FIG. 6 shows an example of a composite track, according to some embodiments.

FIG. 6 shows an example of a composite track 600, according to some embodiments. The track composition track v 600 is composed of other tile/sub-picture tracks $v_1$ 602A through $y_r$ 602R. Timed metadata tracks can be associated with (e.g., or can make reference to) respective tracks to provide metadata about media content in these tracks. As shown, for example, a timed metadata track 604 is associated with the composition track v 600, and a timed metadata track is associated with each tile/sub-picture track, as shown by timed metadata track 606A associated with tile/sub-picture track $v_1$ 602A and timed metadata track 606R associated with tile/sub-picture track $v_r$ 602R.

FIG. 7 shows an example of a sub picture track grouping composition 700 with background and alpha blending information, according to some embodiments. The track grouping composition 700 extends the Composite of All 'tgcp' transform property 702. As discussed further below, the track grouping composition 700 transform property can specify a single color canvas background, a single image background, and/or signal the blending information.

The track grouping composition 700 transform property can be used to specify a derived track, each of whose sample images is a larger canvas overlaid with sample images of one or more input tracks in the layering order that is same as the order they are listed (e.g., the bottom-most input image first, and so on, up to the top-most input image last). The time-parallel samples of the tracks of the same sub-picture composition track group can be spatially arranged according to the syntax and semantics of the track group. In some embodiments, aspects can be specified based on the associated sub-picture composition track group box 'spco,' as specified in n16824. For example, the size of the canvas can be specified by the composition_width and composition_ height, and the sizes and locations of sample images of the input tracks are specified by track_width, track_height, track_x and track_y in the associated sub-picture composition track group box 'spco.'

In some embodiments, the extended transform property can impose constraints. For example, 'tgcp' 702 indicates that the number of input entries num input is greater or equal to 1, and/or the input entities are visual tracks. In some embodiments, constraints can be placed on the input tracks. For example, all the input tracks may belong to a same track group, such that each input track contains the sub-picture composition track group box 'spco,' discussed above and specified in n16824, with a same track group id value. Additionally, or alternatively, the constraints can include that not any two of the tracks belong to a same alternate track group (e.g., they contain no track header box 'tkhd' with a same non-zero alternate_group value that indicates they belong to a same alternate group for the purpose of selecting only one from the alternate group). Therefore, the background and blending information can be contained within the track grouping composition 700, and the sub-picture tracks can be put together using the information in the 'spco' box (e.g., such that the track grouping composition 700 specifies that the information in the 'spco' box carried by each sub-picture track is used to perform the composition).

The background_flag 704 indicates the type of background to be used for deriving a composition track. A zero value indicates that no background is specified. When the background flag is equal to one (e.g., background_flag 704 & 1 is equal to 1), the background is a colored background, with the color value specified by canvas_fill_value 706. The canvas_fill_value 706 can indicate the pixel value per channels used, e.g., if no pixel of any input image is located at a particular pixel location. The fill values can be specified as RGBA (e.g., Red, Green, Blue, and A corresponding to loop counter j equal to 0, 1, 2, and 3, respectively). The RGB values can be in the sRGB color space as specified in IEC 61966-2-1. The A value can be a linear opacity value ranging from, for example, 0 (fully transparent) to 65535 (fully opaque). When the background flag is equal to two (e.g., background_flag & 2 is equal to 2), the background is an image identified by image_item_ID 708. The image identified by image_item_ID can be scaled to cover the background. For example, the image can be scaled with the sizes specified by composition_width and composition_height in the sub-picture composition track grouping 'spco.'

The blending_flag 710 indicates whether blending is involved when overlaying input visual tracks in deriving the composition track. If one, then blending is involved, or if zero (or another value besides one), then no blending is involved. The alpha_blending_mode 712 specifies the alpha blending mode. The blending mode can be specified with values in the exemplar table in Section 2.3.2. The values of exemplary table 500 in FIGS. 5A-5B can be used. The parameter value of 'layer' in TrackHeaderBox of each track, which specifies the front-to-back ordering of visual tracks, may be set and used as a relative front and back layer indicator for compositing two tracks. The blending_mode_specific_params 714 specify optional parameters with a given blending mode. For example, the blending_mode_specific_params 714 can specify parameters other than using those of default values specified in, e.g. ISO/IEC 23001-8, such as including alpha channel data as discussed above.

FIG. 8 shows an example of a sub picture track group matrix composition 800 with background and alpha blending information, according to some embodiments. The track group matrix composition 800 extends the Composite of All 'tmcp' transform property 802. As discussed further below, the track group matrix composition 800 transform property can specify a single color canvas background, a single image background, and/or blending information (e.g., image overlay blending). The signaling of the blending information can complement and/or overwrite the signaling inside the sub-picture composition track group box 'spco,' as discussed above and as proposed in m41002.

The track group matrix composition 800 transform property can be used to specify a derived track, each of whose sample images is a larger canvas overlaid with sample images of one or more input tracks in the layering order that is same as the order they are listed (e.g., ordered with the bottom-most input image first and the top-most input image last). Aspects can be specified by the sub-picture composition track group box 'spco.' For example, the size of the canvas can be specified by composition_width and composition_height, and the sizes and locations of sample images of the input tracks can be specified by the width, height, and matrix in the track header TrackHeaderBox 'trkd' of the containing track as indicated by the sub-picture composition track group box 'spco.'

As discussed above, an extended transform property can add constraints. For example, 'tmcp' can indicate that the number of input entries num input is greater or equal to 1, and/or the input entities are visual tracks. As also discussed above, constraints can be placed on the input tracks (e.g., such that all of the input tracks shall belong to a same track group and contain 'spco' with the same track_group_id value, and that not any two of the tracks belong to a same alternate track group).

The background_flag 804 indicates what kinds of background to be used for deriving a composition track. Like the background_flag 704, a zero value indicates no background, a value of one indicates that the background is a colored background (with the color value specified by canvas_fill_value 706), and a value of two indicates that the background is an image identified by image_item_ID (e.g., scaled based on composition_width and composition_height). canvas_fill value indicates the pixel value per channels used if no pixel of any input image is located at a particular pixel location. As discussed above, the canvas_fill_value 706 values can be specified as RGBA.

The blending_flag 810 indicates if blending is involved when overlaying input visual tracks in deriving the composition track. The alpha_blending_mode 812 specifies the alpha blending mode, such as using the values discussed above for the alpha_blending_mode 712. Similarly, as discussed above for blending_mode_specific_params 714, the blending mode specific params 814 can specify optional parameters with a given blending mode, such as alpha channel data.

The disclosed techniques can be used, for example, to support small view changes. For example, it can be desirable to allow the view to change in small increments to provide a better experience (e.g., rather than only allowing major shifts). Small movements will often have different spherical content, and will often need to perform overlay operations. The overlay operations may be complex. For example, the overlay may not be just an overlay based on a single sphere, rather the overlay may also include subpixel tracks from different spheres. Therefore, specifying the overlay in the transform property can be advantageous, e.g., compared to specifying the overly information in the sub picture track and/or header, because otherwise when producing the sub-picture track the decoding device does not know the other tracks or spheres (e.g., it just receives the track itself).

Figure 9:
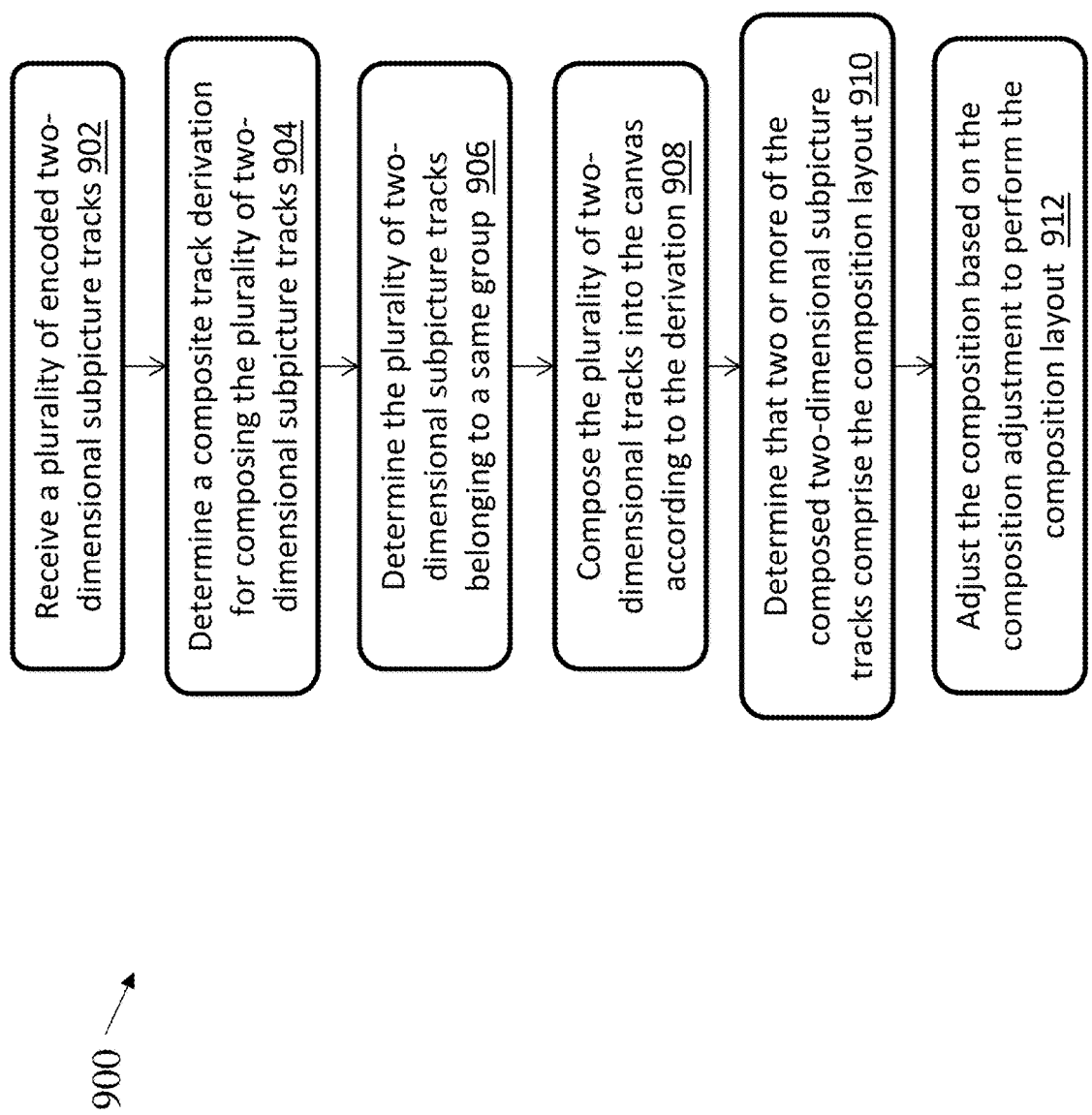
FIG. 9 shows an exemplary computerized method for encoding a track group composition for a plurality of sub-picture tracks, according to some embodiments.

FIG. 9 shows an exemplary method 900 for decoding a composite track derivation for a plurality of sub-picture tracks, according to some embodiments. At step 902, the device (e.g., decoding device 110 in FIG. 1) receives a plurality of encoded two-dimensional sub-picture tracks associated with a viewport. At step 904, the device determines a composite track derivation for composing the plurality of two-dimensional sub-picture tracks for the viewport. As discussed herein, the composite track derivation can include data specifying the plurality of two-dimensional sub-picture tracks belonging to a same group, placement information (e.g., width, height, composition matrix) used to compose sample images from the plurality of two-dimensional tracks (e.g., based on sub-picture composition track group boxes and/or the track header indicated by the sub-picture composition track group boxes) into a canvas associated with the viewport, and/or a composition layout operation (e.g., a background and/or blending information) to adjust the composition layout (e.g., including an operation to process a gap or overlap).

At step 906, the device determines the plurality of two-dimensional sub-picture tracks belonging to a same group. At step 908, the device composes the plurality of two-dimensional tracks into the canvas according to the composite track derivation. At step 910, the device determines that two or more of the composed two-dimensional sub-picture tracks comprise the composition layout. At step 912, the device adjusts the composition based on the composition layout operation to adjust the composition layout.

As discussed herein, the composition layout operation can include determining how to fill a gap. For example, the composition information may include a flag that is used to determine whether to fill the gap with a constant color, whether to use an image for the background, or whether to use video track content as the background. As also discussed herein, the composition layout operation can include a flag used to determine whether to perform blending. If blending is to be performed, the composition information can include parameters to specify how to perform the blending.

As also discussed herein, a sub-picture composition track group box contained in each of the two-dimensional sub-picture tracks can specify the width, the height, or both, of the canvas. In some embodiments, the size, the location, or both, of sample images in the canvas can be specified in the sub-picture composition track group box contained in each of the two-dimensional sub-picture tracks. In some embodiments, a size, a location, or both, of sample images in the canvas can be specified in a track header box of a track containing the two-dimensional sub-picture tracks, and the containing track can be specified in the sub-picture composition track group box contained in each of the two-dimensional sub-picture tracks.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An encoding method for encoding a composite track derivation for a plurality of sub-picture tracks, the encoding method comprising:
   encoding three-dimensional video data in a hierarchical track structure, comprising:
   encoding the three-dimensional video data into a plurality of two-dimensional sub-picture tracks associated with a viewport, wherein the plurality of two-dimensional sub-picture tracks are at a first level of the hierarchical track structure; and encoding a composite track derivation for composing the plurality of two-dimensional sub-picture tracks for the viewport, wherein the composite track derivation is associated with a composite track at a second level in the hierarchical track structure that is above the first level of the plurality of two-dimensional sub-picture tracks, and comprises data indicative of:

the plurality of two-dimensional sub-picture tracks belonging to a same group;

placement information for each of the plurality of two-dimensional sub-picture tracks, wherein the placement information can be used to compose sample images from the plurality of two-dimensional sub-picture tracks into a canvas associated with the viewport, wherein the canvas comprises a plurality of portions and each of the plurality of two-dimensional sub-picture tracks comprises video data for a different portion of the canvas; and a composition layout operation to adjust the composition of the sample images into the canvas if the canvas comprises a composition layout created by two or more of the plurality of two-dimensional sub-picture tracks composed on the canvas; and providing the encoded three-dimensional video data and the composition layout operation.

2. The encoding method of claim 1, wherein the composition layout comprises a gap between the two or more of the plurality of two-dimensional sub-picture tracks composed on the canvas, an overlap of the two or more of the plurality of two-dimensional sub-picture tracks composed on the canvas, or both.

3. The encoding method of claim 1, wherein encoding the composite track derivation comprises:

encoding a width, a height, or both, of the canvas in a sub-picture composition track group box contained in each of the plurality of two-dimensional sub-picture tracks.

4. The encoding method of claim 1, wherein encoding the composite track derivation comprises:

encoding a size, a location, or both, of sample images in the canvas in a sub-picture composition track group box contained in each of the plurality of two-dimensional sub-picture tracks.

5. The encoding method of claim 1, wherein encoding the composite track derivation comprises:

encoding a size, a location, or both, of sample images in the canvas in a track header box of a track containing the plurality of two-dimensional sub-picture tracks; and encoding the track containing the plurality of two-dimensional sub-picture tracks in a sub-picture composition track group box contained in each two-dimensional sub-picture track of the plurality of two-dimensional sub-picture tracks.

6. The encoding method of claim 5, wherein encoding the composite track derivation comprises:

encoding a matrix in the sub-picture composition track group box, wherein the matrix used to overlay each of the plurality of two-dimensional sub-picture tracks on the canvas.

7. A decoding method for decoding video data to derive a composite track, the decoding method comprising:

receiving (a) three-dimensional video data encoded into a plurality of two-dimensional sub-picture tracks associated with a viewport, wherein the plurality of two-dimensional sub-picture tracks are at a first level of a hierarchical track structure, and (b) a composite track derivation for composing the plurality of two-dimensional sub-picture tracks for the viewport, wherein the composite track derivation is associated with a composite track at a second level in the hierarchical track structure that is above the first level of the plurality of two-dimensional sub-picture tracks, and comprises data indicative of:

the plurality of two-dimensional sub-picture tracks belonging to a same group;

placement information for each of the plurality of two-dimensional sub-picture tracks, wherein the placement information can be used to compose sample images from the plurality of two-dimensional sub-picture tracks into a canvas associated with the viewport, wherein the canvas comprises a plurality of portions and each of the plurality of two-dimensional sub-picture tracks comprises video data for a different portion of the canvas; and a composition layout operation to adjust the composition of the sample images into the canvas if the canvas comprises a composition layout created by two or more of the plurality of two-dimensional sub-picture tracks composed on the canvas carried in a derived track;

determining the plurality of two-dimensional sub-picture tracks belonging to a same group; and composing the plurality of two-dimensional sub-picture tracks into the canvas according to the composite track derivation to derive a composite track, comprising:

determining two or more of the composed two-dimensional sub-picture tracks comprise the composition layout; and adjusting the composition based on the composition layout operation to compensate for the composition layout.

8. The decoding method of claim 7, wherein determining the two or more of the composed two-dimensional sub-picture tracks comprise the composition layout comprises determining the two or more of the composed two-dimensional sub-picture tracks comprise a gap between the two or more of the composed plurality of two-dimensional sub-picture tracks composed on the canvas, an overlap of the two or more of the composed plurality of two-dimensional sub-picture tracks composed on the canvas, or both.

9. The decoding method of claim 7, further comprising decoding the composite track derivation, comprising:

decoding a width, a height, or both, of the canvas in a sub-picture composition track group box contained in each of the plurality of two-dimensional sub-picture tracks.

10. The decoding method of claim 7, further comprising decoding the composite track derivation, comprising:

decoding a size, a location, or both, of sample images in the canvas in a sub-picture composition track group box contained in each of the plurality of two-dimensional sub-picture tracks.

11. The decoding method of claim 7, further comprising decoding the composite track derivation, comprising:

decoding a size, a location, or both, of sample images in the canvas in a track header box of a track containing the plurality of two-dimensional sub-picture tracks; and decoding the track containing the plurality of two-dimensional sub-picture tracks in a sub-picture composition track group box contained in each two-dimensional sub-picture track of the plurality of two-dimensional sub-picture tracks.

12. The decoding method of claim 11, wherein decoding the composite track derivation further comprises:
decoding a matrix in the sub-picture composition track group box, wherein the matrix used to overlay each of the plurality of two-dimensional sub-picture tracks on the canvas.

13. An apparatus configured to decode video data, the apparatus comprising a processor in communication with memory, the processor being configured to execute instructions stored in the memory that cause the processor to:
receive (a) three-dimensional video data encoded into a plurality of two-dimensional sub-picture tracks associated with a viewport, wherein the plurality of two-dimensional sub-picture tracks are at a first level of a hierarchical track structure, and (b) a composite track derivation for composing the plurality of two-dimensional sub-picture tracks for the viewport, wherein the composite track derivation is associated with a composite track at a second level in the hierarchical track structure that is above the first level of the plurality of two-dimensional sub-picture tracks, and comprises data indicative of:
the plurality of two-dimensional sub-picture tracks belonging to a same group;
placement information for each of the plurality of two-dimensional sub-picture tracks, wherein the placement information can be used to compose sample images from the plurality of two-dimensional sub-picture tracks into a canvas associated with the viewport, wherein the canvas comprises a plurality of portions and each of the plurality of two-dimensional sub-picture tracks comprises video data for a different portion of the canvas; and
a composition layout operation to adjust the composition of the sample images into the canvas if the canvas comprises a composition layout created by two or more of the plurality of two-dimensional sub-picture tracks composed on the canvas carried in a derived track;
determine the plurality of two-dimensional sub-picture tracks belonging to a same group; and
compose the plurality of two-dimensional sub-picture tracks into the canvas according to the composite track derivation to derive a composite track, comprising:
determining two or more of the composed two-dimensional sub-picture tracks comprise the composition layout; and
adjusting the composition based on the composition layout operation to compensate for the composition layout.

14. The apparatus of claim 13, wherein determining the two or more of the composed two-dimensional sub-picture tracks comprise the composition layout comprises determining the two or more of the composed two-dimensional sub-picture tracks comprise a gap between the two or more of the composed plurality of two-dimensional sub-picture tracks composed on the canvas, an overlap of the two or more of the composed plurality of two-dimensional sub-picture tracks composed on the canvas, or both.

15. The apparatus of claim 13, wherein the instructions are further configured to cause the processor to decode the composite track derivation, comprising:
decoding a width, a height, or both, of the canvas in a sub-picture composition track group box contained in each of the plurality of two-dimensional sub-picture tracks.

16. The apparatus of claim 13, wherein the instructions are further configured to cause the processor to decode the composite track derivation, comprising:
decoding a size, a location, or both, of sample images in the canvas in a sub-picture composition track group box contained in each of the plurality of two-dimensional sub-picture tracks.

17. The apparatus of claim 13, wherein the instructions are further configured to cause the processor to decode the composite track derivation, comprising:
decoding a size, a location, or both, of sample images in the canvas in a track header box of a track containing the plurality of two-dimensional sub-picture tracks; and
decoding the track containing the plurality of two-dimensional sub-picture tracks in a sub-picture composition track group box contained in each of the two-dimensional sub-picture track of the plurality of two-dimensional sub-picture tracks.

18. The apparatus of claim 17, wherein decoding the composite track derivation further comprises:
decoding a matrix in the sub-picture composition track group box, wherein the matrix used to overlay each of the plurality of two-dimensional sub-picture tracks on the canvas.

19. An apparatus for encoding video data, the apparatus comprising a processor in communication with memory, the processor being configured to execute instructions stored in the memory that cause the processor to:
encode three-dimensional video data in a hierarchical track structure, comprising:
encoding the three-dimensional video data into a plurality of two-dimensional sub-picture tracks associated with a viewport, wherein the plurality of two-dimensional sub-picture tracks are at a first level of the hierarchical track structure; and
encode a composite track derivation for composing the plurality of two-dimensional sub-picture tracks for the viewport, wherein the composite track derivation is associated with a composite track at a second level in the hierarchical track structure that is above the first level of the plurality of two-dimensional sub-picture tracks, and comprises data indicative of:
the plurality of two-dimensional sub-picture tracks belonging to a same group;
placement information for each of the plurality of two-dimensional sub-picture tracks, wherein the placement information can be used to compose sample images from the plurality of two-dimensional sub-picture tracks into a canvas associated with the viewport, wherein the canvas comprises a plurality of portions and each of the plurality of two-dimensional sub-picture tracks comprises video data for a different portion of the canvas; and
a composition layout operation to adjust the composition of the sample images into the canvas if the canvas comprises a composition layout created by two or more of the plurality of two-dimensional sub-picture tracks composed on the canvas; and
provide the encoded three-dimensional video data and the composition layout.

* * * * *